US008855907B2

(12) United States Patent
Eckhoff et al.

(10) Patent No.: US 8,855,907 B2
(45) Date of Patent: Oct. 7, 2014

(54) AWARDING PRIVILEGES TO A VEHICLE BASED UPON ONE OR MORE FUEL UTILIZATION CHARACTERISTICS

(75) Inventors: Philip A. Eckhoff, Bellevue, WA (US); William H. Gates, III, Redmond, WA (US); Peter L. Hagelstein, Carlisle, MA (US); Roderick A. Hyde, Redmond, WA (US); Muriel Y. Ishikawa, Livermore, CA (US); Jordin T. Kare, Seattle, WA (US); Robert Langer, Newton, MA (US); Eric C. Leuthardt, St. Louis, MO (US); Erez Lieberman, Cambridge, MA (US); Nathan P. Myhrvold, Medina, WA (US); Michael Schnall-Levin, Cambridge, MA (US); Clarence T. Tegreene, Bellevue, WA (US); Lowell L. Wood, Jr., Bellevue, WA (US)

(73) Assignee: Searete LLC, Bellevue, WA (US)

( * ) Notice: Subject to any disclaimer, the term of this patent is extended or adjusted under 35 U.S.C. 154(b) by 1282 days.

(21) Appl. No.: 12/387,492

(22) Filed: May 1, 2009

(65) Prior Publication Data

US 2010/0280703 A1    Nov. 4, 2010

Related U.S. Application Data

(63) Continuation-in-part of application No. 12/387,331, filed on Apr. 30, 2009.

(51) Int. Cl.
*G06F 19/00* (2011.01)
(52) U.S. Cl.
USPC ............ 701/123; 701/22; 701/29.1; 455/3.05

(58) Field of Classification Search
USPC ................. 701/33, 22, 99, 93, 70, 123, 29.1; 180/65.275, 65.29; 903/930; 320/132, 320/109, 101; 340/164, 455, 439; 705/7; 380/255; 455/3.05
See application file for complete search history.

(56) References Cited

U.S. PATENT DOCUMENTS

| | | | |
|---|---|---|---|
| 5,487,002 A | 1/1996 | Diller et al. |
| 5,815,824 A | 9/1998 | Saga et al. |
| 6,107,691 A | 8/2000 | Gore et al. |
| 6,201,312 B1 | 3/2001 | Shioiri et al. |
| 6,366,848 B1 | 4/2002 | Gustavsson |
| 6,404,332 B1 | 6/2002 | Wakashiro et al. |

(Continued)

FOREIGN PATENT DOCUMENTS

CN            1941024 A        4/2007

OTHER PUBLICATIONS

PCT International Search Report; International App. No. PCT/US 10/01289; bearing a date of Jul. 9, 2010; pp. 1-2.

(Continued)

*Primary Examiner* — Ronnie Mancho
(74) *Attorney, Agent, or Firm* — Advent, LLP

(57) ABSTRACT

A device may include a determination module for determining at least one of a status indicative of combustible fuel utilization or a status indicative of electricity utilization for propelling a hybrid vehicle; and a transmitter coupled with the determination module for transmitting the at least one of the status indicative of combustible fuel utilization or the status indicative of electricity utilization for the hybrid vehicle to an off-site entity.

59 Claims, 10 Drawing Sheets

(56) References Cited

U.S. PATENT DOCUMENTS

| | | | |
|---|---|---|---|
| 6,457,351 B1 | 10/2002 | Yamamoto | |
| 6,480,767 B2 | 11/2002 | Yamaguchi et al. | |
| 6,483,198 B2 | 11/2002 | Schmitz et al. | |
| 6,622,804 B2 | 9/2003 | Schmitz et al. | |
| 6,649,289 B2 | 11/2003 | Hsu et al. | |
| 6,697,717 B2 | 2/2004 | Shioda et al. | |
| 6,793,027 B1* | 9/2004 | Yamada et al. | 180/65.1 |
| 7,013,205 B1 | 3/2006 | Hafner et al. | |
| 7,130,766 B2 | 10/2006 | Tanase | |
| 7,141,321 B2 | 11/2006 | McArthur et al. | |
| 7,440,840 B2 | 10/2008 | Tsukamoto et al. | |
| 7,441,321 B2 | 10/2008 | Baumgartner et al. | |
| 7,615,875 B1 | 11/2009 | Henneberg et al. | |
| 7,653,474 B2 | 1/2010 | Cawthorne et al. | |
| 7,717,202 B2 | 5/2010 | Brigham et al. | |
| 7,748,483 B2 | 7/2010 | Usoro | |
| 7,756,617 B1 | 7/2010 | Cluff et al. | |
| 7,863,855 B2* | 1/2011 | Nomoto | 320/101 |
| 7,891,004 B1 | 2/2011 | Gelvin et al. | |
| 7,918,763 B2 | 4/2011 | Stoffels et al. | |
| 7,946,951 B2 | 5/2011 | Kimura et al. | |
| 7,994,907 B2 | 8/2011 | Fujisawa et al. | |
| 8,000,852 B2 | 8/2011 | Oyobe et al. | |
| 8,095,290 B2 | 1/2012 | Smyth et al. | |
| 8,099,207 B2 | 1/2012 | Fletcher et al. | |
| 8,151,916 B2 | 4/2012 | Gearhart | |
| 8,195,382 B2 | 6/2012 | Bowen et al. | |
| 8,217,777 B2 | 7/2012 | Sekiyama et al. | |
| 8,346,603 B2 | 1/2013 | Sakakibara et al. | |
| 2002/0062183 A1 | 5/2002 | Yamaguchi et al. | |
| 2002/0111851 A1 | 8/2002 | Folkers | |
| 2002/0132144 A1 | 9/2002 | McArthur et al. | |
| 2003/0046580 A1 | 3/2003 | Taniguchi et al. | |
| 2003/0083848 A1* | 5/2003 | Kami | 702/187 |
| 2004/0110044 A1 | 6/2004 | McArthur et al. | |
| 2005/0021191 A1 | 1/2005 | Taniguchi et al. | |
| 2005/0052080 A1 | 3/2005 | Maslov et al. | |
| 2005/0057098 A1* | 3/2005 | Bouchon | 307/10.1 |
| 2005/0143898 A1 | 6/2005 | Kaneko et al. | |
| 2005/0234616 A1 | 10/2005 | Oliver et al. | |
| 2006/0011395 A1 | 1/2006 | Sugiyama et al. | |
| 2006/0015235 A1 | 1/2006 | Ringger et al. | |
| 2006/0048516 A1 | 3/2006 | Tenbrock et al. | |
| 2006/0182055 A1 | 8/2006 | Coffee et al. | |
| 2006/0238321 A1 | 10/2006 | Chen | |
| 2006/0253235 A1 | 11/2006 | Bi et al. | |
| 2007/0073455 A1 | 3/2007 | Oyobe et al. | |
| 2007/0095587 A1 | 5/2007 | DuCharme | |
| 2007/0112475 A1 | 5/2007 | Koebler et al. | |
| 2007/0205028 A1 | 9/2007 | Leone et al. | |
| 2007/0205029 A1 | 9/2007 | Leone et al. | |
| 2007/0250232 A1 | 10/2007 | Dourney, Jr. et al. | |
| 2007/0255485 A1 | 11/2007 | Kaita | |
| 2007/0255634 A1 | 11/2007 | Alley | |
| 2007/0284438 A1 | 12/2007 | Carragher | |
| 2007/0294026 A1 | 12/2007 | Schirmer | |
| 2008/0125928 A1 | 5/2008 | Conlon et al. | |
| 2008/0154671 A1* | 6/2008 | Delk | 705/7 |
| 2008/0204191 A1 | 8/2008 | Alrabady | |
| 2008/0227590 A1 | 9/2008 | Kimura et al. | |
| 2008/0234888 A1* | 9/2008 | Zanardelli et al. | 701/33 |
| 2008/0288132 A1 | 11/2008 | King et al. | |
| 2008/0312782 A1 | 12/2008 | Berdichevsky et al. | |
| 2009/0018695 A1 | 1/2009 | Kronenberg et al. | |
| 2009/0021385 A1 | 1/2009 | Kelty et al. | |
| 2009/0023548 A1 | 1/2009 | Imamura et al. | |
| 2009/0023648 A1 | 1/2009 | Stredonsky et al. | |
| 2009/0050383 A1 | 2/2009 | Brigham et al. | |
| 2009/0144149 A1 | 6/2009 | Sakakibara et al. | |
| 2009/0210357 A1* | 8/2009 | Pudar et al. | 705/412 |
| 2009/0229900 A1* | 9/2009 | Hafner et al. | 180/65.275 |
| 2009/0259345 A1 | 10/2009 | Kato et al. | |
| 2009/0259354 A1 | 10/2009 | Krupadanam et al. | |
| 2009/0299568 A1 | 12/2009 | Schlingmann et al. | |
| 2009/0309697 A1 | 12/2009 | Miller et al. | |
| 2010/0006351 A1 | 1/2010 | Howard | |
| 2010/0010706 A1 | 1/2010 | Gormley | |
| 2010/0031924 A1 | 2/2010 | Sun et al. | |
| 2010/0044123 A1 | 2/2010 | Perlman et al. | |
| 2010/0049397 A1 | 2/2010 | Liu et al. | |
| 2010/0052888 A1* | 3/2010 | Crowe et al. | 340/461 |
| 2010/0197449 A1 | 8/2010 | Imamura et al. | |
| 2010/0211643 A1 | 8/2010 | Lowenthal et al. | |
| 2010/0228415 A1 | 9/2010 | Paul | |
| 2010/0248896 A1 | 9/2010 | Dreier | |
| 2010/0274426 A1 | 10/2010 | Le Brusq et al. | |
| 2010/0280686 A1 | 11/2010 | Eckhoff et al. | |
| 2010/0280688 A1 | 11/2010 | Eckhoff et al. | |
| 2010/0280689 A1 | 11/2010 | Eckhoff et al. | |
| 2010/0280690 A1 | 11/2010 | Eckhoff et al. | |
| 2010/0280691 A1 | 11/2010 | Eckhoff et al. | |
| 2010/0280692 A1 | 11/2010 | Eckhoff et al. | |
| 2010/0280693 A1 | 11/2010 | Eckhoff et al. | |
| 2010/0280703 A1 | 11/2010 | Eckhoff et al. | |
| 2010/0280704 A1 | 11/2010 | Eckhoff et al. | |
| 2010/0280705 A1 | 11/2010 | Eckhoff et al. | |
| 2010/0280706 A1 | 11/2010 | Eckhoff et al. | |
| 2010/0280707 A1 | 11/2010 | Eckhoff et al. | |
| 2010/0280708 A1 | 11/2010 | Eckhoff et al. | |
| 2010/0280709 A1 | 11/2010 | Eckhoff et al. | |
| 2010/0280885 A1 | 11/2010 | Eckhoff et al. | |
| 2010/0280886 A1 | 11/2010 | Eckhoff et al. | |
| 2011/0022259 A1 | 1/2011 | Niwa | |
| 2011/0029173 A1 | 2/2011 | Hyde et al. | |
| 2011/0029358 A1 | 2/2011 | Hyde et al. | |
| 2011/0106354 A1 | 5/2011 | Eckhoff et al. | |
| 2011/0106591 A1 | 5/2011 | Eckhoff et al. | |
| 2011/0127095 A1 | 6/2011 | Imamura et al. | |
| 2011/0166726 A1 | 7/2011 | Fakler et al. | |
| 2011/0246019 A1* | 10/2011 | Mineta | 701/33 |

OTHER PUBLICATIONS

Burke et al.; "Power Train Trade-offs for Electric and Hybrid Vehicles"; Vehicular Technology Conference; bearing a date of 1980; pp. 1-10; vol. 30; Vehicular Technology Society IEEE (best copy available).

Contadini, J. Fernando; "Social Cost Comparison Among Fuel Cell Vehicle Alternatives"; 35th Intersociety Energy Conversion Engineering Conference and Exhibit; bearing a date of 2000; pp. 1341-1351; vol. 2; American Institute of Aeronautics and Astronautics, Inc. (best copy available).

Danhong et al.; "A Study on Fuzzy Control of Energy Management System in Hybrid Electric Vehicle"; Asia-Pacific Power and Energy Engineering Conference; bearing a date of 2009; pp. 1-4; IEEE.

Dawood et al.; "Performance and Fuel Economy Comparative Analysis of Conventional, Hybrid, and Fuel Cell Heavy-Duty Transit Buses"; 58th Vehicular Technology Conference; bearing a date of 2003; pp. 3310-3315; vol. 5; IEEE.

Dike et al.; "Development of a Versatile Voltage Stability Index Algorithm"; 2007 IEEE Canada Electrical Power Conference; bearing a date of 2007; pp. 556-561; IEEE.

Ehsani et al.; "Hybrid Electric Vehicles: Architectures and Motor Drives"; Proceedings of the IEEE; Apr. 2007; pp. 719-728; vol. 95, No. 4; IEEE.

Fuengwarodsakul, Nisai H.; "Retrofitting a Used Car with Hybrid Electric Propulsion System"; 6th International Conference on Electrical Engineering/Electronics, Computer, Telecommunications and Information Technology; bearing a date of 2009; pp. 114-117; vol. 1; IEEE.

Gurkaynak et al.; "State of the Art Power Management Algorithms for Hybrid Electric Vehicles"; 2009 Vehicle Power and Propulsion Conference; bearing a date of 2009; pp. 388-394; IEEE.

Hajimiri et al.; "A Fuzzy Energy Management Strategy for Series Hybrid Electric Vehicle with Predictive Control and Durability Extension of the Battery"; IEEE Conference on Electric and Hybrid Vehicles; bearing a date of 2006; pp. 1-5; IEEE.

Jenkins et al.; "Utilization and Effect of Plug-in Hybrid Electric Vehicles in the United States Power Grid"; IEEE Vehicle Power and Propulsion Conference VPPC; Sep. 3-5, 2008; pp. 1-5; IEEE.

Meng et al.; "Optimized Fuzzy Logic Control Strategy of Hybrid

(56) References Cited

OTHER PUBLICATIONS

Vehicles Using Advisor"; 2010 International Conference on Computer Mechatronics, Control and Electronic Engineering (CMCE); bearing a date of 2010; pp. 444-447; IEEE.

Moghbelli et al.; "New Generation of Passenger Vehicles: FCVor HEV?"; 2006 International Conference on Industrial Technology; bearing a date of 2006; pp. 452-459; IEEE.

Nanda et al.; "A Survey and Comparison of Characteristics of Motor Drives Used in Electric Vehicles"; Canadian Conference on Electrical and Computer Engineering, 2006; bearing a date of May 2006; pp. 811-814; IEEE.

Opila et al.; "Incorporating Drivability Metrics into Optimal Energy Management Strategies for Hybrid Vehicles"; Proceedings of the $47^{th}$ IEEE Conference on Decision and Control; Dec. 9-11, 2008; pp. 4382-4389; IEEE.

Opila et al.; "Performance Comparison of Hybrid Vehicle Energy Management Controllers on Real-World Drive Cycle Data"; 2009 American Control Conference; Jun. 10-12, 2009; pp. 4618-4625; AACC.

Shidore et al.; "Trade-off between PHEV fuel efficiency and estimated battery cycle life with cost analysis"; Vehicle Power and Propulsion Conference, 2009; bearing a date of 2009; pp. 669-677; IEEE.

Shuai et al.; "A Research on the Fuel Quantity Control for Common Rail Diesel Engine in the Hybrid Electric Vehicles Working on the Low-load Area"; Industrial Electronics and Applications; $4^{th}$ IEEE Conference; May 25-27, 2009; pp. 440-444; IEEE.

Smit et al.; "A Generation Reserve Optimization Model Incorporating Demand Market Participation"; IEEE Power Engineering Society Power Africa 2007 Conference and Exposition; Jul. 16-20, 2007; pp. 1-5; IEEE.

Sulzberger, C.; "Early road warrior, part 2: competing electric and gasoline vehicles"; Power & Energy Magazine; Sep.-Oct. 2004; pp. 83-88; vol. 2, No. 5; IEEE.

Suresh et al.; "Smart infrastructure for carbon foot print analysis of electric vehicles"; $13^{th}$ International IEEE Annual Conference on Intelligent Transportation Systems; Sep. 19-22, 2010; pp. 949-954; IEEE.

Syed et al.; "Fuzzy Rule-Based Driver Advisory System for Fuel Economy Improvement in a Hybrid Electric Vehicle"; Annual Meeting of the North American Fuzzy Information Processing Society; bearing a date of 2007; pp. 178-183; IEEE.

Szumanowski et al.; "Method of Battery Adjustment for Hybrid Drive by Modeling and Simulation"; 2005 IEEE Conference on Vehicle Power and Propulsion; bearing a date of 2005; pp. 681-687; IEEE.

Thounthong et al.; "Performance Investigation of Fuel Cell/Battery and Fuel Cell/Supercapacitor Hybrid Sources for Electric Vehicle Applications"; $4^{th}$ IET Conference on Power Electronics, Machines and Drives; bearing a date of 2008; pp. 455-459; IEEE.

Williamson et al.; "Impact of Energy Storage Device Selection on the Overall Drive Train Efficiency and Performance of Heavy-Duty Hybrid Vehicles"; 2005 IEEE Conference on Vehicle Power and Propulsion; bearing a date of 2005; pp. 381-390; IEEE.

Wirasingha et al.; "Classification and Review of Control Strategies for Plug-in Hybrid Electric Vehicles"; Vehicle Power and Propulsion Conference 2009; bearing a date of 2009; pp. 907-914; IEEE.

Wirasingha et al.; "Classification and Review of Control Strategies for Plug-in Hybrid Electric Vehicles"; IEEE Transactions on Vehicular Technology; Jan. 2011; pp. 111-122; vol. 60, No. 1; IEEE.

Akli et al.; "Energy management and sizing of a hybrid locomotive"; Power Electronics and Applications, 2007 European Conference on; Digital Object Identifier: 10.1109/EPE.2007.4417333; Publication Year: 2007, pp. 1-10.

Badin et al.; "Hybrid electric vehicles energy consumption decrease according to drive train architecture, energy management and vehicle use"; Hybrid Vehicle Conference, IET the Institution of Engineering and Technology; 2006; Publication Year: 2006, pp. 213-224.

Cerruto et al.; "Energy flows management in hybrid vehicles by fuzzy logic controller"; Electrotechnical Conference, 1994. Proceedings, $7^{th}$ Mediterranean; Digital Object Identifier; 10.1109/MELCON. 1994.380823; Publication Year: 1994, pp. 1314-1317; vol. 3; IEEE.

Jalil et al.; "A rule-based energy management strategy for a series hybrid vehicle"; Proceedings of the American Control Conference, Jun. 1997; vol. 1; Digital Object Identifier: 10.1109/ACC.1997. 611889; Publication Year: 1997, pp. 689-693; AACC.

Kashiwagi et al.; "Energy Policy & New National Energy Strategy in Japan"; 2007 International Conference on Thermoelectrics; Digital Object Identifier: 10.1109/ICT.2007.4569510; Publication Year: 2007, pp. 420-425; IEEE.

Lee et al.; "An AHP/DEA hybrid model for measuring the relative efficiency of energy efficiency technologies"; Industrial Engineering and Engineering Management, Proceedings of the 2007 IEEE/IEEM; Digital Object Identifier: 10.1109/IEEM.2007.4419150; Publication Year: 2007, pp. 55-59; IEEE.

Lin et al.; "Energy management strategy for a parallel hybrid electric truck"; Proceedings of the American Control Conference, Jun. 25-27, 2001; vol. 4; Digital Object Identifier: 10.1109/ACC.2001.946337; Publication Year: 2001, pp. 2878-2883; AACC.

Mallette et al.; "Financial incentives to encourage demand response participation by plug-in hybrid electric vehicle owners"; Energy Conversion Congress and Exposition (ECCE), 2010 IEEE; Digital Object Identifier: 10.1109/ECCE.2010.5618472; Publication Year: 2010, pp. 4278-4284; IEEE.

Ortmeyer et al.; "Transportation sector technology energy use and GHG emissions"; Power Engineering Society Summer Meeting, 2002 IEEE; vol. 1; Digital Object Identifier: 10.1109/PESS.2002. 1043173; Publication Year: 2002, pp. 34-35; IEEE.

Ortmeyer et al.; "Trends in transportation sector technology energy use and greenhouse gas emissions"; Proceedings of the IEEE; vol. 89, Issue 12; Digital Object Identifier: 10.1109/5.975921; Publication Year: 2001, pp. 1837-1847; IEEE.

Brandl, M. et al.; "Batteries and Battery Management Systems for Electric Vehicles"; Design, Automation & Test in Europe Conference & Exhibition; bearing a date of 2012; 5 pages; EDAA.

Irwin, N. et al.; "Transit Vehicle Fleet Information and On-Line Management"; IEEE Transactions on Vehicular Technology; May 1980; pp. 230-235; vol. VT-29, Issue No. 2; IEEE.

Morozumi, S. et al.; "Strategies and Status of Grid-connection Technology Development in NEDO"; Power and Energy Society General Meeting—Conversion and Delivery of Electrical Energy in the $21^{st}$ Century; bearing a date of 2008; pp. 1-6; IEEE.

Shafiee, S. et al.; "Investigating the Impacts of Plug-in Hybrid Electric Vehicles on Power Distribution Systems"; IEEE Transactions on Smart Grid; Bearing dates of Jul. 29, 2012, Oct. 30, 2012, and Feb. 23, 2013; pp. 1-10; IEEE.

"Transitory"; Dictionary.com; printed on May 9, 2013; 1 page; located at: http://dictionary.reference.com/browse/Transitory?s=t.

Gao et al.; "Systematic Design of Fuel Cell Powered Hybrid Vehicle Drive Train"; Electric Machines and Drives Conference; bearing a date of 2001; pp. 604-611; IEEE.

Paganelli et al.; "Control development for a hybrid-electric sport-utility vehicle: strategy, implementation and field test results"; Proceedings of the American Control Conference, Arlington, VA; Jun. 25-27, 2001; pp. 5064-5069; vol. 6; AACC.

Syed et al.; "Rule-Based Fuzzy Gain-Scheduling PI Controller to Improve Engine Speed and Power Behavior in a Power-split Hybrid Electric Vehicle"; Fuzzy Information Processing Society, Annual meeting of the North American; bearing a date of 2006; pp. 284-289; IEEE.

Tsuruta et al.; "A New Zero-Voltage-Zero-Current-Transition Chopper SAZZ for a FCEV Drive"; Industrial Electronics Society, $31^{st}$ Annual Conference of IEEE; bearing a date of 2005; pp. 573-578; IEEE.

Morchin, William C.; "Energy Management in Hybrid Electric Vehicles"; Digital Avionics Systems Conference, Proceedings $17^{th}$DASC; 1998; pp. 141-141 through 141-146; vol. 2; IEEE.

Oman, Henry; On-Board Energy and Power Management on Electric Vehicles: Effect of Battery Type; Digital Avionics Systems Conference, Proceedings $17^{th}$ DASC; 1998; pp. 143-141 through 143-146; vol. 2; IEEE.

\* cited by examiner

122 Wireless Signal

124 Radio Signal

126 Microwave Signal

127 Terahertz Signal

128 Infrared Signal

130 Optical Signal

132 Ultraviolet Signal

134 Subsonic Signal

136 Audible Signal

138 Ultrasonic Signal

140 Magnetic Signal

FIG. 6

142 Connector

- 146 Serial Port
- 148 Serial Cable
- 150 Parallel Port
- 152 Parallel Cable
- 154 Network Port
- 156 Network Cable
- 158 USB Port
- 160 USB Cable
- 162 Fiber Optic Port
- 164 Fiber Optic Cable

FIG. 7

166 Physical Media

- 168 Removable Media
- 170 Optical Disc
- 172 CD
- 174 DVD
- 176 Blu-Ray Disc
- 178 HD DVD
- 180 Removable HDD
- 182 External HDD
- 184 USB Drive
- 186 Memory Card
- 188 Smart Key

FIG. 8

AWARDING PRIVILEGES TO A VEHICLE BASED UPON ONE OR MORE FUEL UTILIZATION CHARACTERISTICS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of United States Patent Application entitled AWARDING PRIVILEGES TO A VEHICLE BASED UPON ONE OR MORE FUEL UTILIZATION CHARACTERISTICS, naming PHILIP ECKHOFF; WILLIAM GATES; PETER L. HAGELSTEIN; RODERICK A. HYDE; MURIEL Y. ISHIKAWA; JORDIN T. KARE; ROBERT LANGER; ERIC C. LEUTHARDT; EREZ LIEBERMAN; NATHAN P. MYHRVOLD; MICHAEL SCHNALL-LEVIN; CLARENCE T. TEGREENE; AND LOWELL L. WOOD, JR. as inventors, filed Apr. 30, 2009, application Ser. No. 12/387,331, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

A device may include a determination module for determining at least one of a status indicative of combustible fuel utilization or a status indicative of electricity utilization for propelling a hybrid vehicle; and a transmitter coupled with the determination module for transmitting the at least one of the status indicative of combustible fuel utilization or the status indicative of electricity utilization for the hybrid vehicle to an off-site entity.

A device may include a determination module for determining a status indicative of combustible fuel utilization in comparison to electricity utilization for propelling a vehicle; and a transmitter coupled with the determination module and configured to transmit to an off-site entity the status indicative of combustible fuel utilization in comparison to electricity utilization for the vehicle.

A vehicle may include a first drive train powered by combustible fuel for propelling the vehicle; a second drive train powered by electricity for propelling the vehicle; a determination module coupled with at Least one of the first drive train or the second drive train for determining at least one of a status indicative of combustible fuel utilization or a status indicative of electricity utilization for propelling the vehicle; and a transmitter coupled with the determination module and configured to transmit to an off-site entity the at least one of the status indicative of combustible fuel utilization or the status indicative of electricity utilization for the vehicle.

A vehicle may include a first drive train powered by combustible fuel for propelling the vehicle; a second drive train powered by electricity for propelling the vehicle; a determination module coupled with the first drive train and the second drive train for determining a status indicative of combustible fuel utilization in comparison to electricity utilization for propelling the vehicle; and a transmitter coupled with the determination module and configured to transmit to an off-site entity the status indicative of combustible fuel utilization in comparison to electricity utilization for the vehicle.

A vehicle may include at least one drive train powered by electricity for propelling the vehicle; at least one combustion device configured to supply propulsive energy for propelling the vehicle, the at least one combustion device powered by combustible fuel; a determination module coupled with at least one of the at least one drive train or the at least one combustion device for determining at least one of a status indicative of combustible fuel utilization or a status indicative of electricity utilization for propelling the vehicle; and a transmitter coupled with the determination module and configured to transmit to an off-site entity the at least one of the status indicative of combustible fuel utilization or the status indicative of electricity utilization for the vehicle.

A vehicle may include at least one drive train powered by electricity for propelling the vehicle; at least one combustion device configured to supply propulsive energy for propelling the vehicle, the at least one combustion device powered by combustible fuel; a determination module coupled with the at least one drive train and the at least one combustion device for determining a status indicative of combustible fuel utilization in comparison to electricity utilization for propelling the vehicle; and a transmitter coupled with the determination module and configured to transmit to an off-site entity the status indicative of combustible fuel utilization in comparison to electricity utilization for the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 6 is a schematic of a wireless signal.

FIG. 7 is a schematic of a connector.

FIG. 8 is a schematic of a physical media.

DETAILED DESCRIPTION

Figure 1:
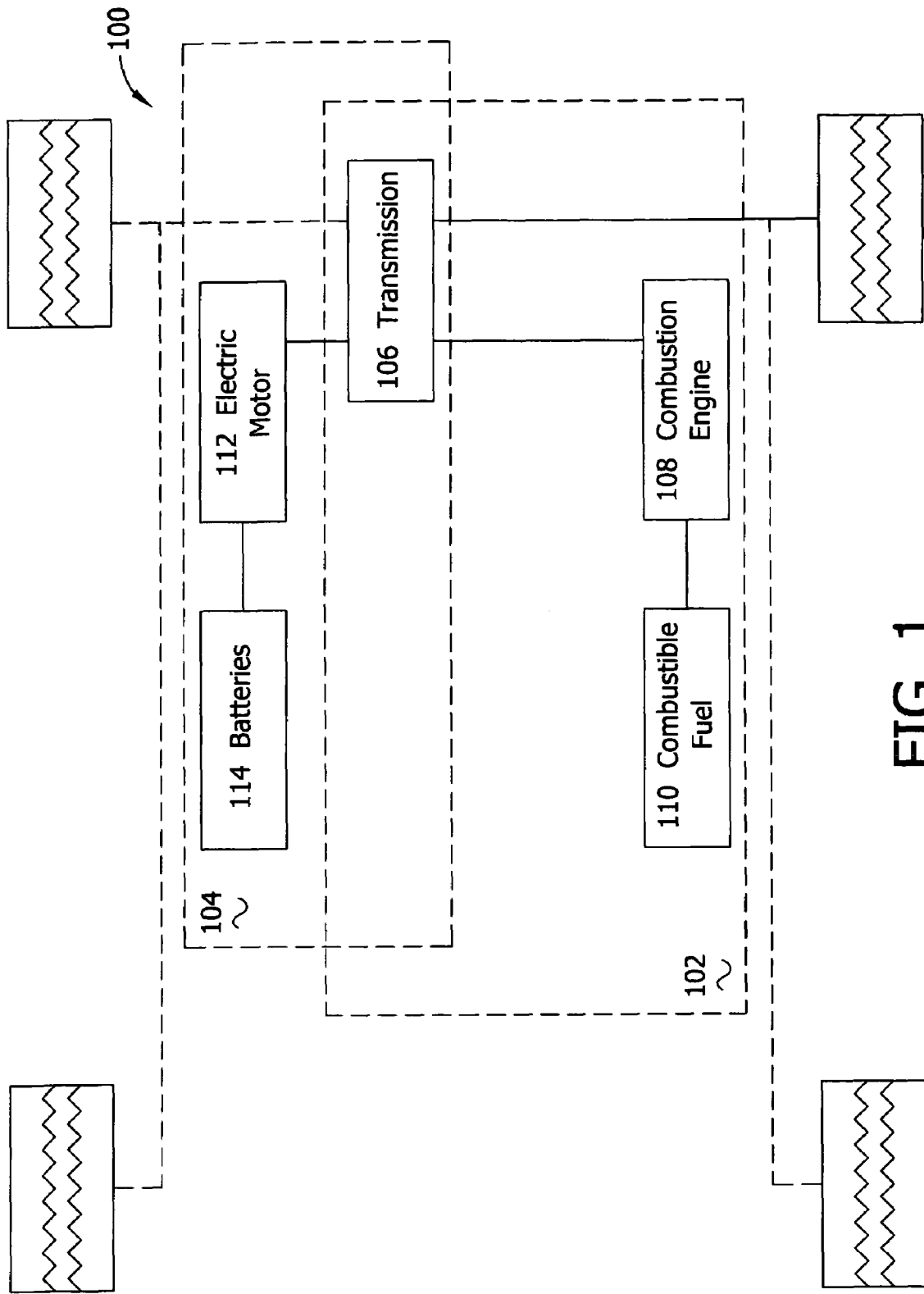
FIG. 1 is a schematic of a hybrid vehicle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. After reading the disclosure herein, those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, and the vehicle to be utilized is a choice dependent upon the context in which the vehicle will be deployed and the specific concerns (e.g., speed, flexibility, or predictability) of the implementer, any of which may vary. After reading the disclosure herein, those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instruction operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Referring now to FIGS. 1 through 10, a vehicle 100 is described in accordance with the present disclosure. The vehicle 100 may be propelled utilizing one or more of a combustible fuel and electricity. For instance, the vehicle 100 may be a hybrid vehicle that utilizes both a first drive train 102 powered by combustible fuel for driving (propelling) the vehicle 100 and a second drive train 104 powered by electricity for driving (propelling) the vehicle 100.

In an embodiment, one or more rewards or privileges is provided to the vehicle 100 (or to its owner, driver or one or more passengers), based upon driving characteristics that provide some benefit to the surroundings. A reward or privilege may include access to an otherwise prohibited route, such as, for example, a Heavily Occupied Vehicle (HOV) lane, or access to a lower-burden route, such as a toll-free lane. A benefit to the surroundings may include, for example, a decrease in emissions (e.g., where emissions include the exhaust from a combustion engine powered by combustible fuel) or lower fuel consumption. Thus, in a case where the first drive train 102 includes a combustion engine, and the second drive train 104 includes a battery, utilization of the second drive train 104 may be preferable over the first drive train 102 from an environmental standpoint and may qualify the vehicle 100 for one or more privileges or rewards.

A combustible fuel may include any fuel capable of reacting with an oxidizing element to produce heat (and possibly reaction products). Organic-based fuels are one type of combustible fuel. Organic-based fuels may include, but are not limited to, alcohols (i.e., compounds having a hydroxyl group bound to a carbon atom of an alkyl or substituted alkyl group), such as ethyl alcohol (ethanol), methyl alcohol (methanol), and isopropyl alcohol, etc.; ketones (i.e., compounds having a carbonyl group bonded to two other carbon atoms), such as acetone, acetophenone, and methyl ethyl ketone, etc.; and hydrocarbon-based fuels.

Hydrocarbon-based fuels may include, but are not limited to, gasoline (also referred to as gas or petrol) derived from petroleum and containing a mixture of hydrocarbons including hexane, heptane, or octane (gasoline may be enhanced with iso-octane or toluene or benzene); diesel (also known as petroleum diesel); natural gas or Liquid Petroleum Gas (LPG), mixtures of gaseous hydrocarbons associated with petroleum deposits (natural gas may include methane combined with ethane, propane, or butane); kerosene; naphtha (a petroleum fraction which may be further processed); and various oils and bio-fuels, i.e., mineral, vegetable, or synthetic substances or animal or vegetable fats. It is further contemplated that hydrocarbon-based fuels may include fuel additives, such as hybrid compound blends (e.g., polymerization agents for increased fuel ignition surface area, stabilizers, catalysts, or detergents); alcohols (e.g., methanol, ethanol, or isopropyl alcohol); ethers; antioxidants; antiknock agents; lead scavengers; or fuel dyes and the like.

It is contemplated that a combustible fuel may include hydrogen. Further, a combustible fuel may include any fuel capable of chemical combustion (e.g., sodium or magnesium in the presence of water).

In an embodiment, illustrated in FIG. 1, the vehicle 100 includes a first drive train 102 comprising a transmission 106 coupled with a combustion device (e.g., combustion engine 108) powered by combustible fuel 110. The vehicle 100 also includes a second drive train 104 comprising the transmission 106 coupled with an electric motor 112 powered by one or more batteries 114. Both the combustion engine 108 and the electric motor 112 are configured to supply power to the transmission 106 (either together or separately) for turning one or more wheels and driving, or propelling, the vehicle 100.

Figure 2:
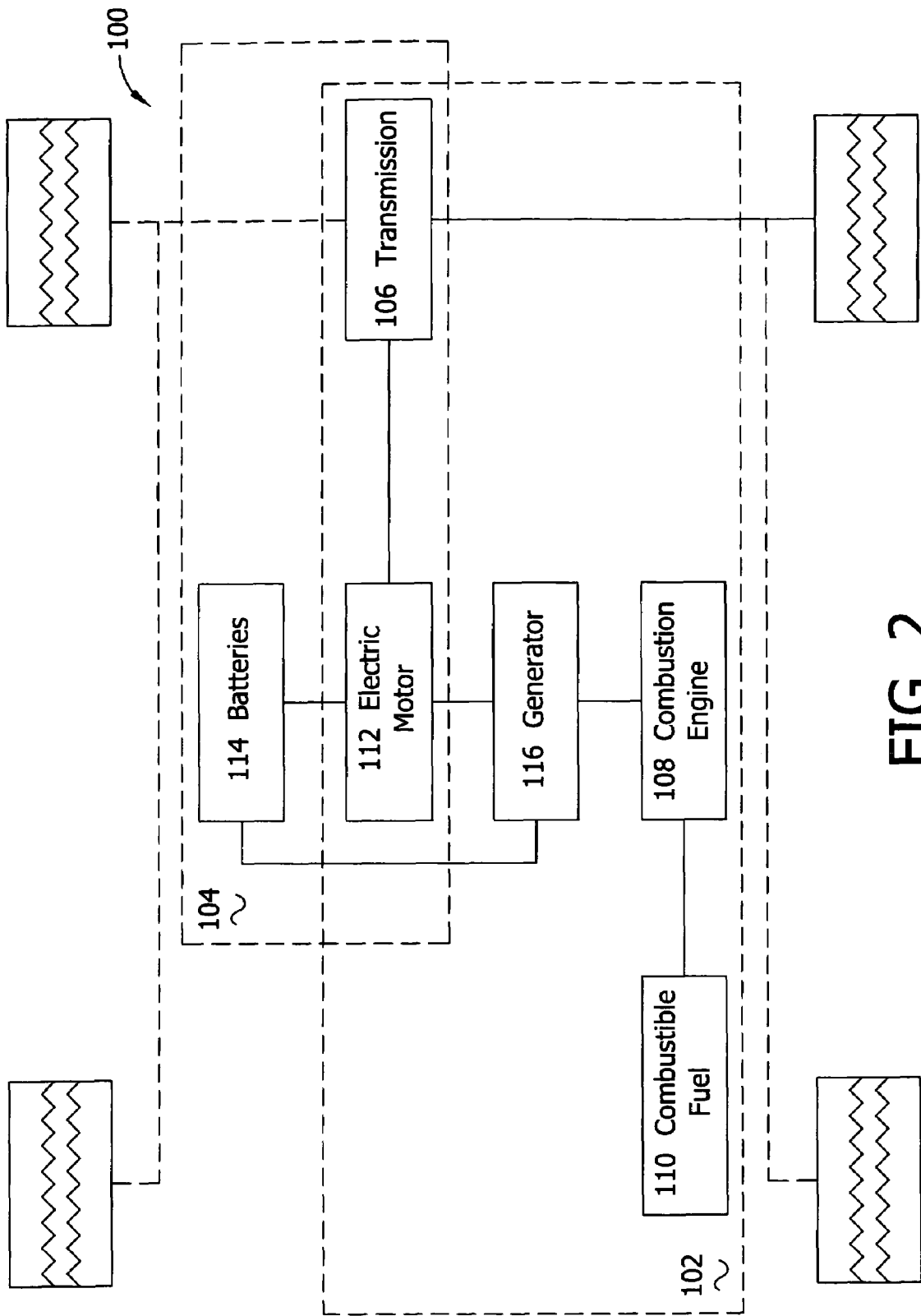
FIG. 2 is a schematic of another hybrid vehicle.

In an embodiment, illustrated in FIG. 2, the vehicle 100 includes a first drive train 102 comprising a transmission 106 coupled with an electric motor 112 powered by a generator 116 coupled with a combustion engine 108 powered by combustible fuel 110. The vehicle 100 also includes a second drive train 104 comprising the transmission 106 coupled with the electric motor 112, which is powered by one or more batteries 114. The generator 116 is also connected to the batteries 114. The generator 116 is configured for either charging the batteries 114, or powering the electric motor 112 to supply power to the transmission 106 for turning one or more wheels and driving the vehicle 100. It will be appreciated that even though the combustion engine 108 is not directly connected to the transmission 106 (in this embodiment), the combustible fuel 110 is still utilized to propel the vehicle 100 via the first drive train 102, by powering the electric motor 112 via the generator 116.

Figure 3:
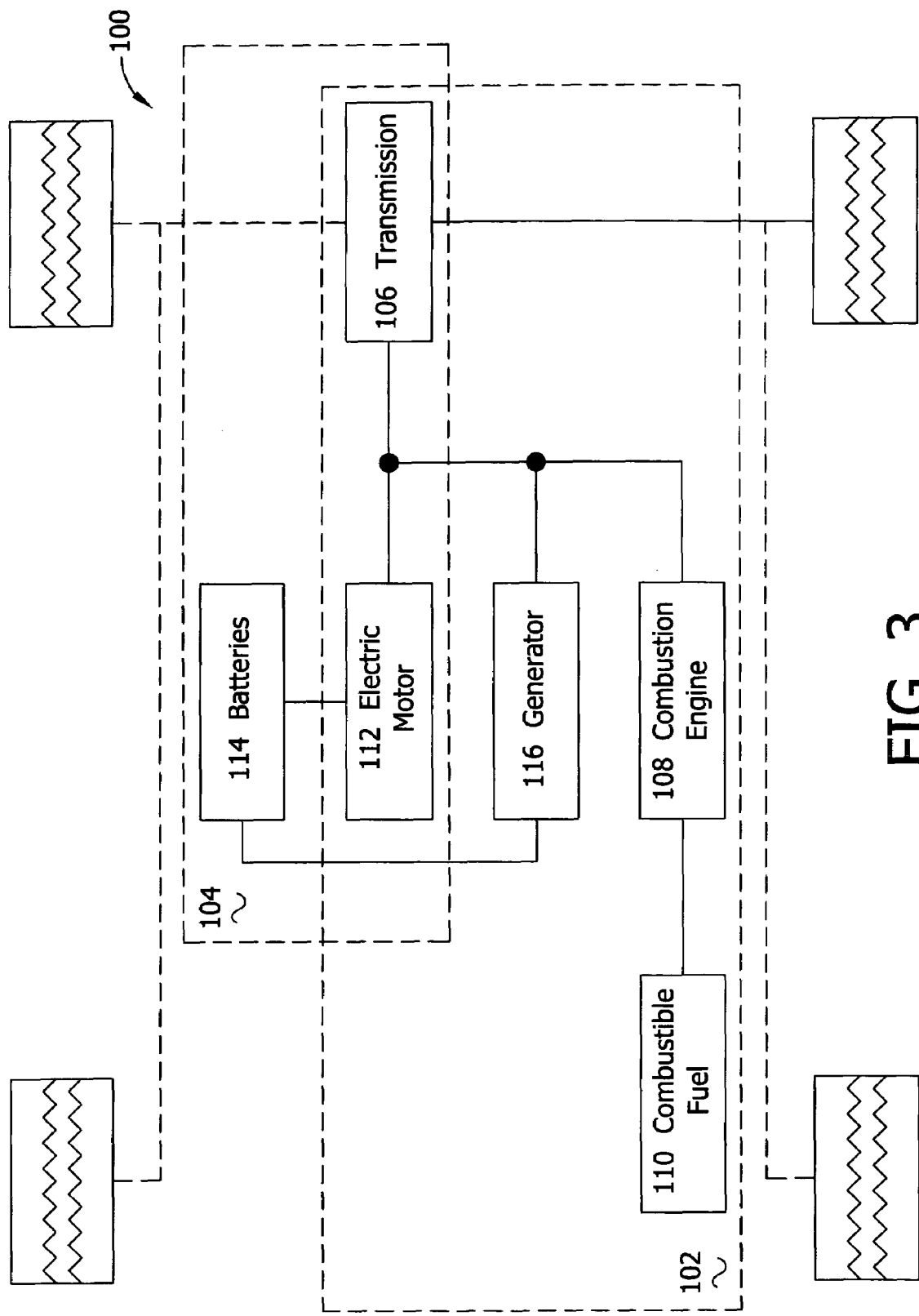
FIG. 3 is a schematic of a hybrid vehicle.
Figure 4:
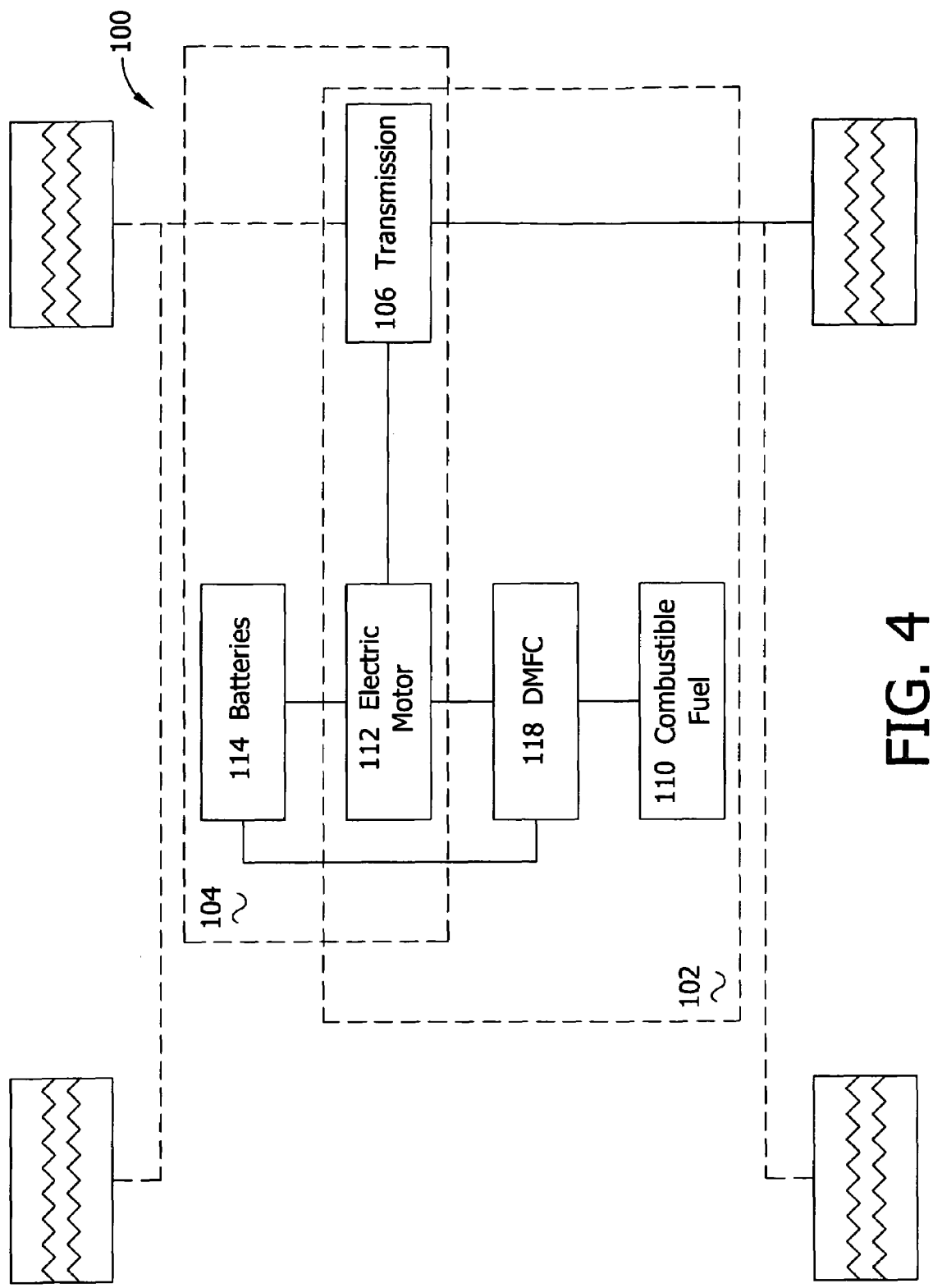
FIG. 4 is a schematic of another hybrid vehicle.
Figure 5:
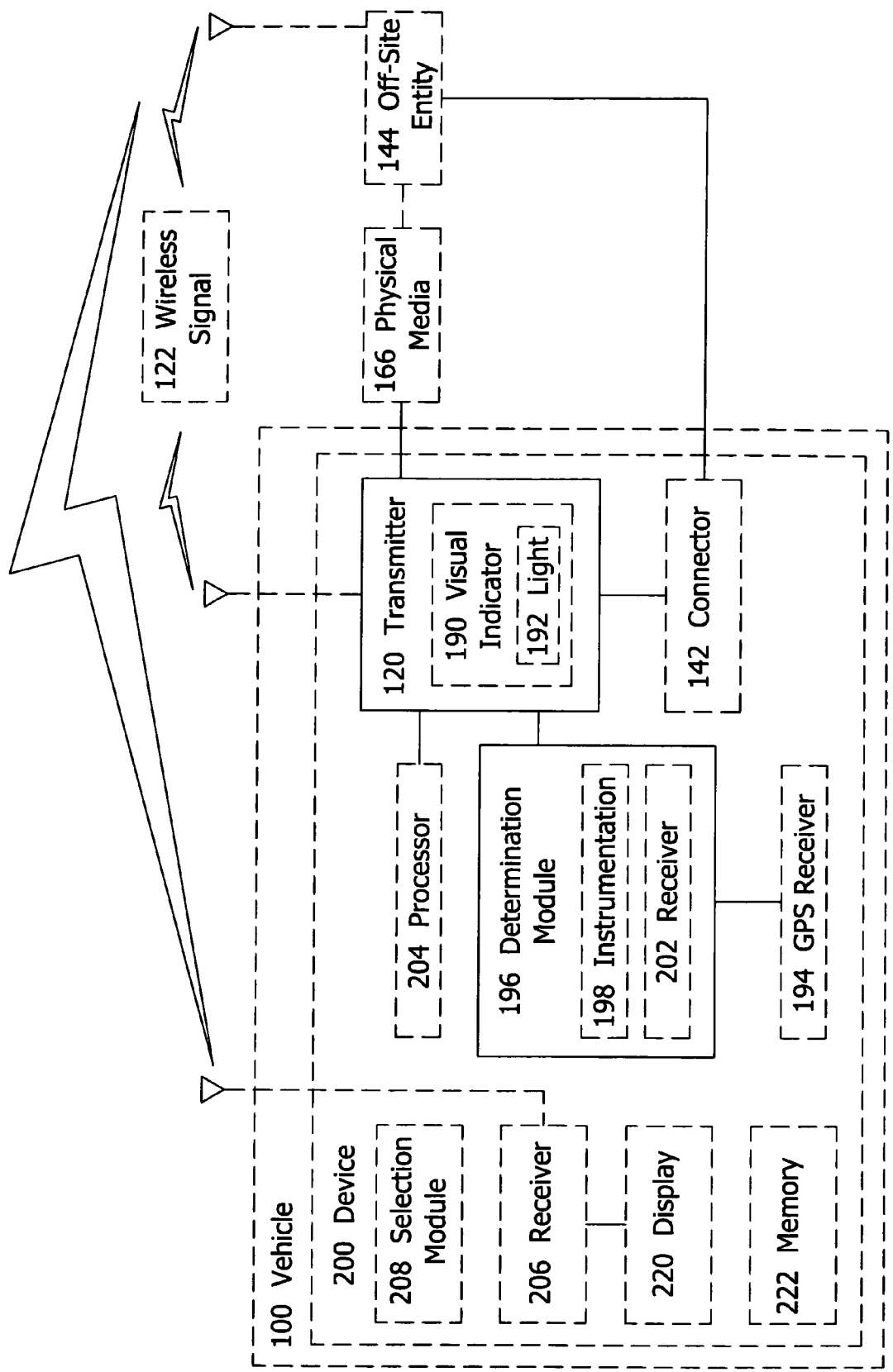
FIG. 5 is a schematic of a vehicle, a device, and an off-site entity.
Figure 9:
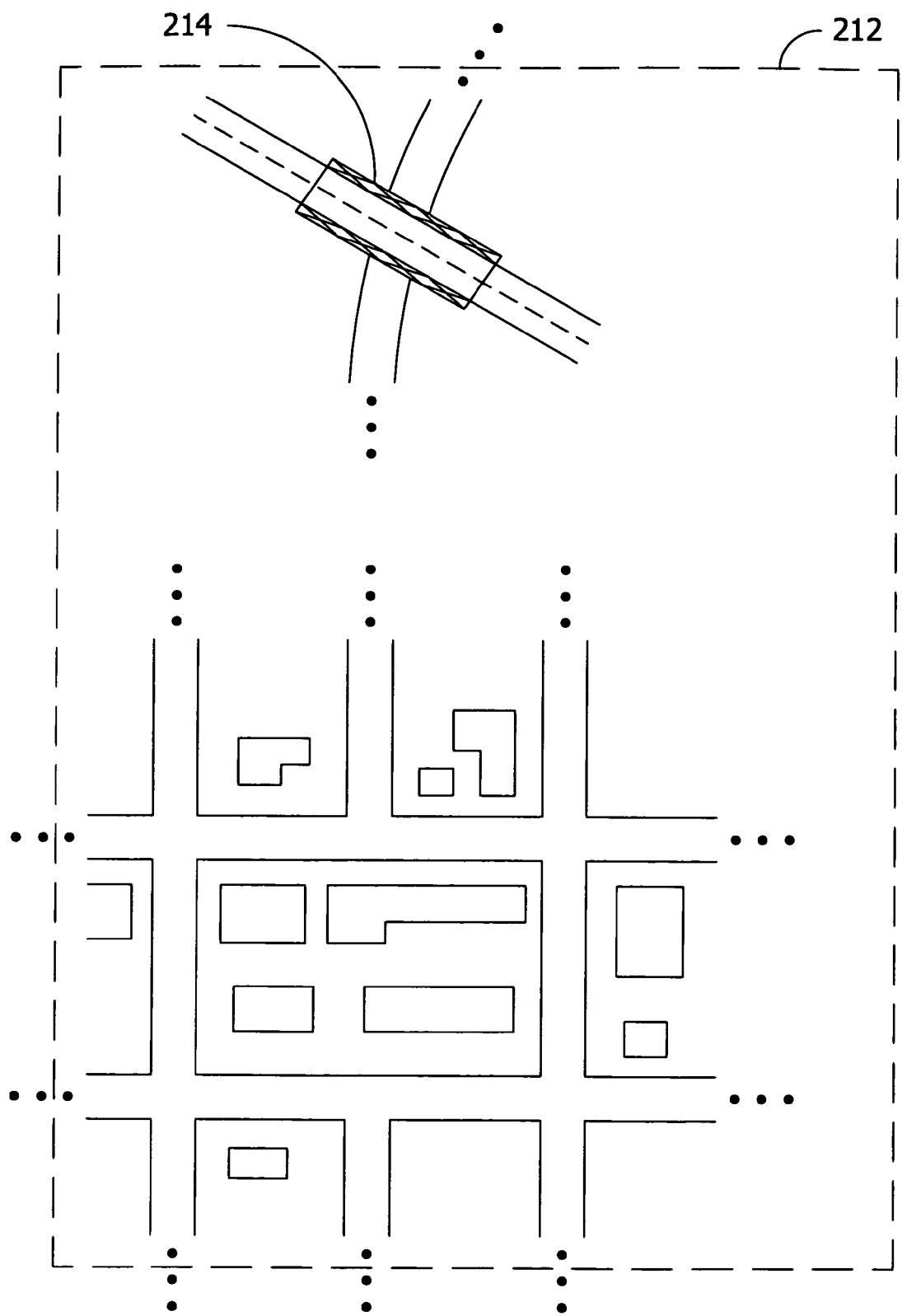
FIG. 9 is a schematic of a geographic region.
Figure 10:
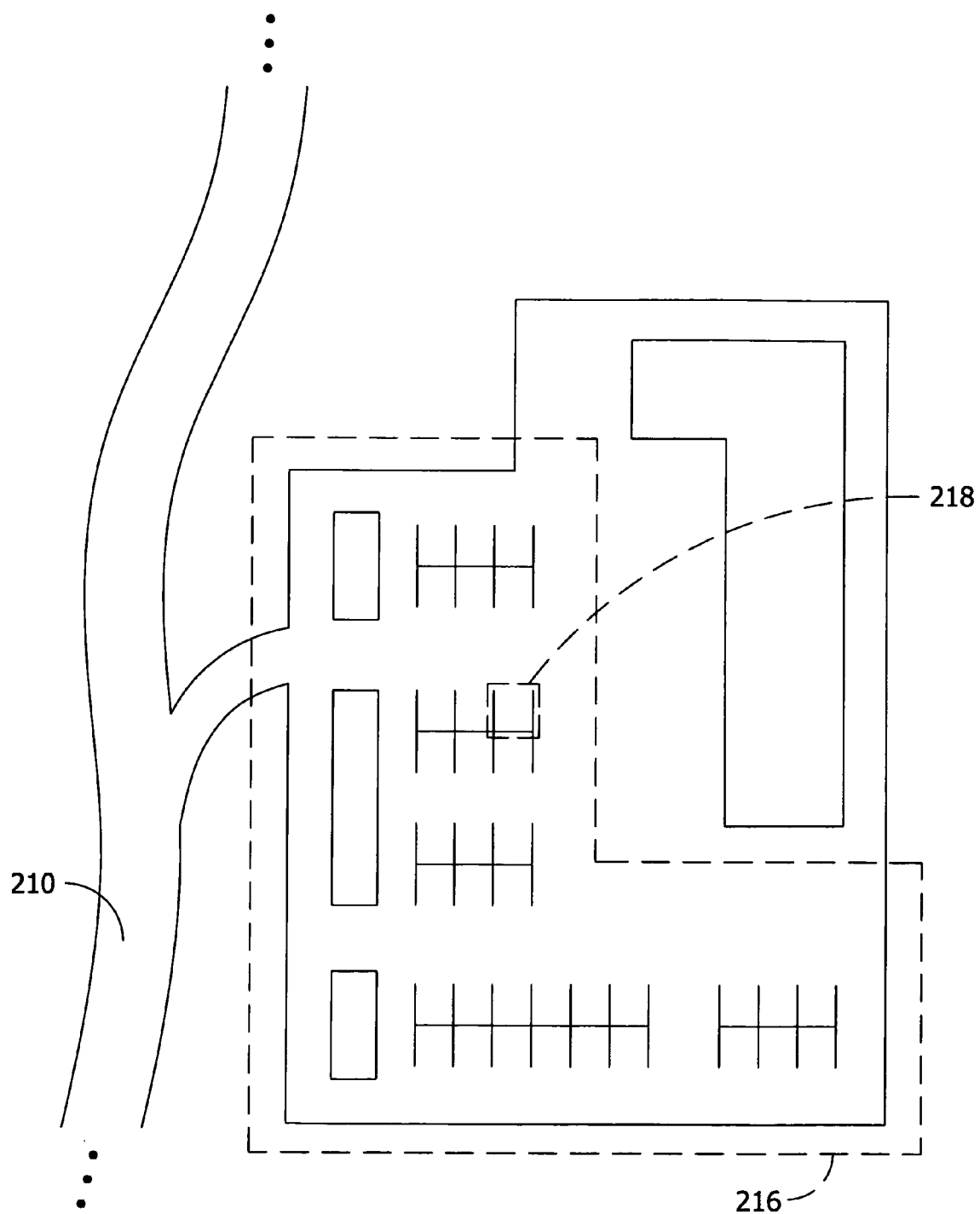
FIG. 10 is a schematic of another geographic region.

In an embodiment, illustrated in FIG. 3, the vehicle 100 includes a first drive train 102 comprising a transmission 106 coupled with an electric motor 112, a generator 116, and a combustion engine 108 powered by combustible fuel 110. The vehicle 100 also includes a second drive train 104 comprising the transmission 106 coupled with the electric motor 112, which is powered by one or more batteries 114. The generator 116 is connected to the batteries 114 for charging the batteries 114. In this embodiment, both the combustion engine 108 and the electric motor 112 are configured to supply power to the transmission 106 (either together or separately) for turning one or more wheels and driving the vehicle 100. For instance, at lower speeds, the electric motor 112 and the batteries 114 may be utilized to power the vehicle 100. At higher speeds, the combustion engine 108 may be utilized with the generator 116 for powering the vehicle 100.

It should be noted that combustible fuel may be utilized to propel the vehicle 100 without combustion actually taking place. For example, in the embodiment illustrated in FIG. 4, the vehicle 100 may be propelled utilizing one or more Direct Methanol Fuel Cells (DMFC) 118 powered by combustible fuel 110 and an electric motor 112 powered by the fuel cells 118 or one or more batteries 114. The vehicle 100 includes a first drive train 102 comprising a transmission 106 coupled with the electric motor 112 and powered by the DMFC 118. The vehicle 100 also includes a second drive train 104 comprising the transmission 106 coupled with the electric motor 112 and powered by the batteries 114. The fuel cells 118 are also connected to the batteries 114 and are configured for either charging the batteries 114, or powering the electric motor 112 to supply power to the transmission 106 for turning one or more wheels and driving the vehicle 100. In an embodiment, the vehicle 100 is supplied with the combustible fuel 110 methanol, which is fed directly to the DMFC 118 where it is utilized to produce electricity in the presence of a catalyst (i.e., the catalyst draws hydrogen directly from the liquid methanol). The electricity is then utilized to propel the vehicle (or stored by the one or more batteries 114). In this configuration, the fuel cells 118 may produce carbon dioxide and water as reaction products.

For the purposes of the present disclosure, propelling the vehicle 100 or charging one or more batteries 114 to propel the vehicle 100 while drawing hydrogen from methanol is considered as utilizing a combustible fuel, just as combusting the fuel to propel the vehicle 100 or to charge one or more batteries 114 to propel the vehicle 100 would be in the case of a combustion engine 108. Further, propelling the vehicle by utilizing energy stored in the batteries 114 while not utilizing the combustible fuel 110 is defined as utilizing electricity. It is also contemplated that the combustible fuel 110 may be utilized to produce electricity for propelling the vehicle 100 while the vehicle 100 also utilizes electrical energy stored in the batteries 114 for propulsion; alternatively, the combustible fuel 110 may be utilized to produce electricity for propelling the vehicle 100 while storing electrical energy in the batteries 114. Combustible fuel utilization may be compared to electricity utilization in any of these configurations. Alternatively, a rate of consumption for either combustible fuel or electricity may be compared against a theoretical or practical limit (e.g., to determine how efficiently one type of energy source or another is being consumed).

The vehicle 100 may include a transmitter 120 for transmitting a status indicative of, for example, one or more of combustible fuel utilization, electricity utilization, and combustible fuel utilization in comparison to electricity utilization for the vehicle 100. The transmitter 120 may transmit the status for the vehicle 100 via a wireless signal 122. For example, the transmitter 120 may transmit the status for the vehicle 100 via one or more of a radio signal 124, a microwave signal 126, a terahertz signal 127, an infrared signal 128, an optical signal 130, an ultraviolet signal 132, a subsonic signal 134, an audible signal 136, an ultrasonic signal 138, or a magnetic signal 140. Alternatively, the transmitter 120 may be coupled with a connector 142 for connecting to an off-site entity 144 and transmitting a status indicative of one or more of combustible fuel utilization, electricity utilization, and combustible fuel utilization in comparison to electricity utilization for the vehicle 100. For instance, the connector 142 may include one or more of a serial port 146, a serial cable 148, a parallel port 150, a parallel cable 152, a network port 154, a network cable 156, a Universal Serial Bus (USB) port 158, a USB cable 160, a fiber optic port 162, or a fiber optic cable 164. The off-site entity 144 may include, for example, a municipality, a road authority, a receiver or transceiver maintained by a road authority, a police department, or another entity having a degree of authority over road utilization.

The transmitter 120 may also be utilized for transmitting a status indicative of one or more of combustible fuel utilization, electricity utilization, and combustible fuel utilization in comparison to electricity utilization for the vehicle 100 via a physical media 166. For example, the transmitter 120 may be configured to transfer a status for the vehicle 100 via one or more of a removable media 168, an optical disc 170, a Compact Disc (CD) 172 (e.g., a CD-ROM, a CD-R, or a CD-RW), a Digital Versatile Disc (DVD) 174 (e.g., a DVD-ROM, a DVD-R, a DVD+R, a DVD-RAM, a DVD-RW, or a DVD+RW), a Blu-ray Disc (BD) 176, a High-Definition DVD (HD DVD) 178, a removable Hard Disk Drive (HDD) 180, an external HDD 182, a Universal Serial Bus (USB) drive 184, a memory card 186, or a smart key 188 (e.g., a Valeo key, or the like). In an embodiment, the transmitter 120 may include a visual indicator 190 on the vehicle 100 for transmitting a status indicative of one or more of combustible fuel utilization, electricity utilization, and combustible fuel utilization in comparison to electricity utilization for the vehicle 100. For example, the vehicle 100 may include a light 192 positioned on one or more of a dashboard, a rear window ledge, or an exterior of the vehicle 100.

In an embodiment, the status may represent a driving mode. For instance, the status may indicate that the vehicle 100 is utilizing electricity for propulsion. Alternatively, the status may indicate that the vehicle 100 is utilizing combustible fuel for propulsion. In an embodiment, the status may be related to a utilization of propulsion resources. For instance, the status may indicate a rate at which the vehicle 100 is utilizing electricity for propulsion. Alternatively, the status may indicate an amount of combustible fuel utilized by the vehicle 100. In an embodiment, the status may be indicative of an instantaneous status (e.g., real-time utilization of combustible fuel or electricity), such as an instantaneous measurement representing the utilization of combustible fuel (e.g., the utilization of combustible fuel over the smallest period of time for which a measured difference is determinable). Alternatively, a rate of change of combustible fuel utilization over time (e.g., a derivative measurement) may constitute an instantaneous measurement. In an embodiment, the status may be indicative of average fuel utilization over a time period (e.g., utilization of combustible fuel or electricity based on time-averaged data). In an embodiment, the status may be indicative of cumulative fuel utilization for a time period, such as the total utilization of combustible fuel over a number of days. In an embodiment, the status may be indicative of cumulative fuel or average fuel economy used over a traversed area; e.g., during traversal through a municipality, or through a state. In an embodiment, the status may be associated with cumulative fuel utilization for a geographic region (e.g., a geographic region identified by a GPS receiver 194), such as the total utilization of combustible fuel while driving on an interstate highway.

The transmitter 120 may be coupled with a determination module 196 for determining the status for the vehicle 100. In one embodiment, the determination module 196 may be instrumentation 198 included with the vehicle 100, such as power-selection instrumentation for selectively enabling one or more of the combustible fuel utilization and the electricity utilization. Alternatively, the instrumentation 198 may be instrumentation included with the vehicle 100 for monitoring the fuel consumption of the vehicle 100, such as a fuel gauge, or the like. In embodiments where the instrumentation 198 is included with the vehicle 100, the transmitter 120 may be added to the vehicle (e.g., where the transmitter 120 is included with an aftermarket part) or selectively coupled with the vehicle (e.g., where the transmitter 120 is included with one or more of a personal communication device, a laptop computer, a palmtop computer, a Personal Digital Assistant (PDA), a portable media player, or a mobile telephone). In an embodiment, the transmitter 120 and the instrumentation 198 may be provided as a single unit, such as a device 200. In this configuration, the instrumentation 198 may be capable of monitoring the status of the vehicle 100 by measuring sound emitted by the vehicle, measuring emissions from the vehicle, or capturing images or movements of the vehicle 100 or its various parts, such as movement of a drive train, or the like. In a still further embodiment, the determination module 196 of the device 200 may include a receiver 202 for receiving the status of the vehicle 100, such as a receiver 202 communicatively coupled with power-selection instrumentation, a fuel gauge, or the like.

The transmitter 120 may transmit the status of the vehicle 100 at different times and upon different conditions. In an embodiment, the transmitter 120 may transmit the status of the vehicle 100 based upon a schedule (e.g., daily, hourly, or the like). In an embodiment, the transmitter may be coupled with a processor 204 for scheduling transmission of the status. In an embodiment, the transmitter 120 may transmit the status of the vehicle 100 based upon a location, such as the location of the vehicle 100 (e.g., when the vehicle crosses from one area into another, such as from a highway authority to a city authority). In an embodiment, the transmitter 120 may transmit the status of the vehicle 100 based upon a change in driving mode. For example, the status may be transmitted when the vehicle switches from electrical power to utilizing the combustible fuel.

The vehicle 100 may include a receiver 206 for receiving data indicative of a privilege allocated upon receipt of the transmitted status. For example, propelling the vehicle 100 with electricity (e.g., by utilizing batteries 114 included with the vehicle 100) may be rewarded by the allocation of a privilege to the vehicle 100. It should be noted that the receiver 202 may comprise the receiver 206. Alternatively, the receiver 206 may be provided separately from the receiver 202. It is contemplated that the vehicle 100 may include a selection module 208 for allowing the vehicle to selectively utilize one or more privileges based upon the transmitted status. For instance, the selection module 208 may allow the vehicle to opt in or opt out of receiving privileges. In an embodiment, the privilege may be allocated by an off-site entity 144 who receives the transmitted status from the vehicle 100, such as a road authority, or the like. For instance, the road authority may query the vehicle 100 for its status. In an embodiment, the off-site entity 144 may broadcast a query to multiple vehicles. In an embodiment, the query may be directed to a specific or pre-designated vehicle. For instance, a vehicle may be selected for a query based upon an occupant of the vehicle.

It is contemplated that the query received from the off-site entity 144 may be transmitted based upon a schedule. Alternatively, the query received from the off-site entity 144 may be transmitted based upon a location (e.g., a location of the vehicle 100 with respect to the off-site entity 144 or to a landmark, such as a highway, a communications tower, or the like). In an embodiment, the query received from the off-site entity 144 may be transmitted based upon a change in driving mode (e.g., when the vehicle 100 switches from utilizing the second drive train 104 to utilizing the first drive train 102). Further, the query received from the off-site entity 144 may be transmitted before entering at least one of a pre-designated roadway, a region, a pre-designated bridge, a pre-designated parking lot, a pre-designated parking spot, or a queue for refueling the combustible fuel or recharging the batteries. In an alternative embodiment, the query received from the off-site entity 144 may be transmitted based upon a past behavior of the vehicle (e.g., a past utilization of the combustible fuel 110 by the vehicle 100).

In an embodiment, the privilege may include permission for the vehicle 100 to utilize a pre-designated roadway 210. In an embodiment, the privilege may include permission for the vehicle 100 to drive into a region 212. In an embodiment, the privilege may include permission for the vehicle 100 to cross a pre-designated bridge 214. In an embodiment, the privilege may include permission for the vehicle 100 to utilize a pre-designated parking lot 216. In an embodiment, the privilege may include permission for the vehicle 100 to utilize a pre-designated parking spot 218. It is also contemplated that the vehicle 100 may be queried for its status to verify the vehicle's compliance with utilization restrictions, such as fuel utilization requirements for a geographical area. In an embodiment, the privilege may include an advanced position in a queue for refueling the combustible fuel 110 or recharging the batteries 114. Further, the vehicle 100 may be queried for its status to determine a qualification for one or more of a tax benefit, an insurance benefit, or a reduction in fees.

It should be noted that the privilege may be reduced or eliminated when the benefit of choosing one driving mode over another (e.g., choosing the second drive train 104 over the first drive train 102) may be outweighed by another behavior. For example, in an embodiment, the privilege may be reduced when an alternate route for the driver or passengers of the vehicle 100 including public transportation is available. In an embodiment, the privilege may be eliminated based upon a number of passengers in the vehicle 100, such as only a driver. Alternatively, the privilege may be increased based upon a number of passengers in the vehicle 100. For instance, a tax benefit may be increased based upon more than one passenger in the vehicle 100.

The vehicle 100 may include a display 220 coupled with the receiver 206 for displaying information associated with the privilege allocated upon receipt of the transmitted status. For example, the receiver 206 may receive a privilege, such as permission to cross a pre-designated bridge 214. The privilege may then be displayed by the display 220. In one embodiment, the display 220 may comprise an audio display, such as a speaker. In this embodiment, for instance, the privilege may be communicated to the driver via an audible announcement, a tone, a musical selection, a simulated voice, or a series of tones. In another embodiment, the display 220 may comprise a visual display, such as a Liquid Crystal Display (LCD), one or more Light Emitting Diodes (LED's), one or more Organic LED's (OLED's), or a Cathode Ray Tube (CRT). In an embodiment, the display 220 is positioned in the vehicle, where it may be easily viewed by the driver or one or more passengers, such as on a dashboard, on a console, on a rear-view mirror, or the like. Further, the display 220 may utilize text-based messages, symbols, indicia, or other identifiable visual characters, symbols, or lights to communicate one or more privileges to the driver or the passengers of the vehicle 100.

It is further contemplated that the vehicle 100 or the device 200 may include a second transmitter (in an embodiment, the transmitter 120 comprises this second transmitter) for transmitting information associated with the privilege allocated upon receipt of the transmitted status to an off-site entity. In an embodiment, the off-site entity 144 may be equipped with a billboard for displaying a message to the vehicle 100 regarding a privilege. Alternatively, another off-site entity, such as a billboard or an electronic sign, may be provided separately from the off-site entity 144, and the transmitter 120 may communicate an assigned privilege to the other off-site entity for display to the driver of the vehicle 100, or to one or more passengers. The off-site entity may comprise a visual display, as previously described, or alternatively, may comprise an audio display, such as a horn, a whistle, or a siren. Further, the off-site entity may comprise a database.

The vehicle 100 may include a memory 222 for storing data regarding the status of the vehicle 100, i.e., data indicative of one or more of combustible fuel utilization, electricity utilization, and combustible fuel utilization in comparison to electricity utilization. For instance, the memory 222 may store data regarding how long the vehicle 100 was operated in a combustible fuel utilization mode versus how long the vehicle 100 was operated in an electricity utilization mode. Further, the vehicle 100 may include a memory 222 for storing data regarding the transmission of the status of the vehicle 100, i.e., data indicative of when one or more of combustible fuel utilization information, electricity utilization information, and combustible fuel utilization in comparison to electricity utilization information was transmitted by the transmitter 120. It will be appreciated that the memory 222 may store such information in an encrypted format. Further, it will be appreciated that the transmitter 120 may transmit the status of the vehicle 100 in an encrypted format.

In addition to transmitting the status of the vehicle 100, the transmitter 120 may transmit additional information which may be of interest to a receiver of the information, such as the road authority, or the like. For instance, the transmitter 120 may transmit information including vehicle identification (e.g., a Vehicle Identification Number (190)), operator identification (e.g., a driver's license number), a time (e.g., the time of the transmission), a location (e.g., the location of the transmission), a direction (e.g., a cardinal direction such as north or south), or a speed (e.g., the speed of the vehicle 100).

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art wilt appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device comprising:
   a determination module for determining a status indicative of combustible fuel utilization in comparison to electricity utilization for propelling a vehicle;
   a transmitter coupled with the determination module and configured to transmit to an off-site entity the status indicative of combustible fuel utilization in comparison to electricity utilization for the vehicle; and
   a receiver for receiving data indicative of a privilege allocated upon receipt of the transmitted status, wherein the privilege comprises at least one of permission for the vehicle to utilize a pre-designated roadway, permission for the vehicle to drive into a region, permission for the vehicle to cross a pre-designated bridge, permission for the vehicle to utilize a pre-designated parking lot, permission for the vehicle to utilize a pre-designated parking spot, or an advanced position in a queue for at least one of refueling the combustible fuel or recharging one or more batteries.

2. The device of claim 1, wherein the transmitter is configured to wirelessly transmit the status indicative of combustible fuel utilization in comparison to electricity utilization for the vehicle.

3. The device of claim 2, wherein the transmitter is configured to transmit the status indicative of combustible fuel utilization in comparison to electricity utilization for the vehicle via at least one of a radio signal, a microwave signal, a terahertz signal, an infrared signal, an optical signal, an ultraviolet signal, a subsonic signal, an audible signal, an ultrasonic signal, or a magnetic signal.

4. The device of claim 1, further comprising:
   a connector coupled with the transmitter for connecting to the off-site entity to transmit the status indicative of combustible fuel utilization in comparison to electricity utilization for the vehicle to the off-site entity.

5. The device of claim 4, wherein the connector comprises at least one of a serial port, a serial cable, a parallel port, a parallel cable, a network port, a network cable, a Universal Serial Bus (USB) port, a USB cable, a fiber optic port, or a fiber optic cable.

6. The device of claim 1, wherein the transmitter is configured to transmit the status indicative of combustible fuel utilization in comparison to electricity utilization for the vehicle via a physical media.

7. The device of claim 6, wherein the transmitter is configured to transmit the status indicative of combustible fuel utilization in comparison to electricity utilization for the vehicle via at least one of a removable media, an optical disc, a Compact Disc (CD), a CD-ROM, a CD-R, a CD-RW, a Digital Versatile Disc (DVD), a DVD-ROM, a DVD-R, a DVD+R, a DVD-RAM, a DVD-RW, a DVD+RW, a Blu-ray Disc (BD), a High-Definition DVD (HD DVD), a removable Hard Disk Drive (HDD), an external HDD, a Universal Serial Bus (USB) drive, a memory card, or a smart key.

8. The device of claim 1, wherein the transmitter is configured to transmit the status indicative of combustible fuel utilization in comparison to electricity utilization for the vehicle via a visual indicator on the vehicle.

9. The device of claim 8, wherein the transmitter is configured to transmit the status indicative of combustible fuel utilization in comparison to electricity utilization for the vehicle via a light positioned on at least one of a dashboard, a rear window ledge, or an exterior of the vehicle.

10. The device of claim 1, wherein the status indicative of combustible fuel utilization in comparison to electricity utilization for the vehicle represents a driving mode.

11. The device of claim 10, wherein the driving mode represents utilization of combustible fuel for propelling the hybrid vehicle.

12. The device of claim 10, wherein the driving mode represents utilization of electricity for propelling the hybrid vehicle.

13. The device of claim 1, wherein the status indicative of combustible fuel utilization in comparison to electricity utilization for the vehicle is related to a utilization of propulsion resources.

14. The device of claim 13, wherein the utilization of propulsion resources is associated with at least one of a rate of combustible fuel utilization or an amount of combustible fuel utilization.

15. The device of claim 13, wherein the utilization of propulsion resources is associated with at least one of a rate of electricity utilization or an amount of electricity utilization.

16. The device of claim 1, wherein the status indicative of combustible fuel utilization in comparison to electricity utilization for the vehicle represents an instantaneous status.

17. The device of claim 1, wherein the status indicative of combustible fuel utilization in comparison to electricity utilization for the vehicle represents an average over a time period.

18. The device of claim 1, wherein the status indicative of combustible fuel utilization in comparison to electricity utilization for the vehicle represents a cumulative utilization for a time period.

19. The device of claim 1, wherein the status indicative of combustible fuel utilization in comparison to electricity utilization for the vehicle represents a cumulative utilization for a geographic region.

20. The device of claim 19, further comprising:
a Global Positioning System (GPS) receiver coupled with the determination module; the device configured to associate the status indicative of combustible fuel utilization in comparison to electricity utilization for the vehicle with a geographic region identified by the GPS receiver.

21. The device of claim 1, wherein the device comprises an aftermarket part.

22. The device of claim 1, wherein the device comprises at least one of a personal communication device, a laptop computer, a palmtop computer, a Personal Digital Assistant (PDA), a portable media player, or a mobile telephone.

23. The device of claim 1, wherein the determination module comprises instrumentation coupled with the transmitter for determining the status indicative of combustible fuel utilization in comparison to electricity utilization for the vehicle.

24. The device of claim 1, wherein the determination module comprises a receiver coupled with the transmitter for receiving the status indicative of combustible fuel utilization in comparison to electricity utilization for the vehicle.

25. The device of claim 1, wherein the transmitter is configured to transmit the status indicative of combustible fuel utilization in comparison to electricity utilization for the vehicle based upon a schedule.

26. The device of claim 1, further comprising:
a processor coupled with the transmitter for scheduling transmission of the status indicative of combustible fuel utilization in comparison to electricity utilization for the vehicle.

27. The device of claim 1, wherein the transmitter is configured to transmit the status indicative of combustible fuel utilization in comparison to electricity utilization for the vehicle based upon a location.

28. The device of claim 1, wherein the transmitter is configured to transmit the status indicative of combustible fuel utilization in comparison to electricity utilization for the vehicle based upon a change in driving mode.

29. The device of claim 1, further comprising:
a selection module for allowing the vehicle to selectively utilize one or more privileges based upon the transmitted status.

30. The device of claim 1, wherein the transmitter is configured to transmit the status indicative of combustible fuel utilization in comparison to electricity utilization for the vehicle in response to a query received from the off-site entity.

31. The device of claim 30, wherein the query received from the off-site entity is for verifying the vehicle's compliance with utilization restrictions.

32. The device of claim 30, wherein the query received from the off-site entity is broadcast to the first vehicle and at least a second vehicle.

33. The device of claim 30, wherein the query received from the off-site entity is directed to the vehicle.

34. The device of claim 33, wherein the query received from the off-site entity is directed to the vehicle based upon an occupant of the vehicle.

35. The device of claim 30, wherein the query received from the off-site entity is transmitted based upon a schedule.

36. The device of claim 30, wherein the query received from the off-site entity is transmitted based upon a location.

37. The device of claim 30, wherein the query received from the off-site entity is transmitted based upon a change in driving mode.

38. The device of claim 30, wherein the query received from the off-site entity is transmitted before the vehicle enters at least one of a pre-designated roadway, a region, a pre-designated bridge, a pre-designated parking lot, a pre-designated parking spot, or a queue for at least one of refueling the combustible fuel or recharging one or more batteries.

39. The device of claim 30, wherein the query received from the off-site entity is transmitted based upon a past behavior of the vehicle.

40. The device of claim 1, wherein the privilege comprises permission for the vehicle to utilize a pre-designated roadway.

41. The device of claim 1, wherein the privilege comprises permission for the vehicle to drive into a region.

42. The device of claim 1, wherein the privilege comprises permission for the vehicle to cross a pre-designated bridge.

43. The device of claim 1, wherein the privilege comprises permission for the vehicle to utilize a pre-designated parking lot.

44. The device of claim 1, wherein the privilege comprises permission for the vehicle to utilize a pre-designated parking spot.

45. The device of claim 1, wherein the privilege comprises an advanced position in a queue for at least one of refueling the combustible fuel or recharging one or more batteries.

46. The device of claim 1, wherein the privilege comprises a qualification for at least one of a tax benefit, an insurance benefit, a reduction in fees, or a reduction in refueling costs.

47. The device of claim 1, wherein the privilege is at least one of reduced or eliminated when an alternate route including public transportation is available.

48. The device of claim 1, wherein the privilege is at least one of increased, reduced, or eliminated based upon a number of passengers in the vehicle.

49. The device of claim 1, further comprising:
a display coupled with the receiver for displaying information associated with the privilege allocated upon receipt of the transmitted status.

50. The device of claim 49, wherein the display comprises at least one of an audio display or a visual display positioned in the vehicle.

51. The device of claim 49, further comprising:
a transmitter for transmitting information associated with the privilege allocated upon receipt of the transmitted status to an off-site entity.

52. The device of claim 51, wherein the off-site entity comprises at least one of a database, an audio display, or a visual display.

53. The device of claim 1, further comprising:
a memory for storing data regarding the status indicative of combustible fuel utilization in comparison to electricity utilization for the vehicle.

54. The device of claim 53, wherein the data regarding the status indicative of combustible fuel utilization in comparison to electricity utilization for the vehicle is configured to be stored in an encrypted format.

55. The device of claim 1, further comprising:
a memory for storing data regarding the transmission of the status indicative of combustible fuel utilization in comparison to electricity utilization for the vehicle.

56. The device of claim 55, wherein the data regarding the transmission of the status indicative of combustible fuel utilization in comparison to electricity utilization for the vehicle is configured to be stored in an encrypted format.

57. The device of claim 1, wherein the status indicative of combustible fuel utilization in comparison to electricity utilization for the vehicle is configured to be transmitted in an encrypted data format.

58. The device of claim 1, wherein the transmitter is configured for transmitting at least one of a vehicle identification, an operator identification, a time, a location, a direction, or a speed.

59. A device comprising:
a transmitter for transmitting to an off-site entity a status indicative of combustible fuel utilization in comparison to electricity utilization for a hybrid vehicle; and
a receiver for receiving data indicative of a privilege allocated upon receipt of the transmitted status, wherein the privilege is increased, reduced, or eliminated based on at least one of an availability of an alternate route including public transportation or a number of passengers in the hybrid vehicle.

\* \* \* \* \*

UNITED STATES PATENT AND TRADEMARK OFFICE
CERTIFICATE OF CORRECTION

| | | |
|---|---|---|
| PATENT NO. | : 8,855,907 B2 | Page 1 of 1 |
| APPLICATION NO. | : 12/387492 | |
| DATED | : October 7, 2014 | |
| INVENTOR(S) | : Philip Eckhoff et al. | |

It is certified that error appears in the above-identified patent and that said Letters Patent is hereby corrected as shown below:

In the Claims

Column 15, Line 17, Claim 51:
"51. The device of claim 49, further comprising:" should read -- "51. The device of claim 1, further comprising:" --

Signed and Sealed this
Third Day of February, 2015

Michelle K. Lee
*Deputy Director of the United States Patent and Trademark Office*